July 19, 1949.  G. E. MERRITT ET AL  2,476,677
CONTINUOUS STRIP CAMERA MAGAZINE
Filed Dec. 3, 1943  8 Sheets-Sheet 1

Fig. 1

INVENTOR.
George E. Merritt and
BY Burr W. Jones
ATTORNEY

Fig. 2

July 19, 1949. G. E. MERRITT ET AL 2,476,677
CONTINUOUS STRIP CAMERA MAGAZINE
Filed Dec. 3, 1943 8 Sheets-Sheet 3

Fig. 3

INVENTOR.
George E. Merritt and
BY Burr W. Jones
Clinton S. Janes
ATTORNEY

July 19, 1949.　　　G. E. MERRITT ET AL　　　2,476,677
CONTINUOUS STRIP CAMERA MAGAZINE Filed Dec. 3, 1943　　　　　　　　　　　　　　8 Sheets-Sheet 6

Fig. 6

INVENTOR.
George E. Merritt and
BY Burr W. Jones
ATTORNEY

July 19, 1949.  G. E. MERRITT ET AL  2,476,677
CONTINUOUS STRIP CAMERA MAGAZINE
Filed Dec. 3, 1943  8 Sheets-Sheet 7

INVENTOR.
George E. Merritt and
BY Burr W. Jones
ATTORNEY

July 19, 1949.　　　G. E. MERRITT ET AL　　　2,476,677
CONTINUOUS STRIP CAMERA MAGAZINE
Filed Dec. 3, 1943　　　　　　　　　　　　8 Sheets-Sheet 8

INVENTOR.
George E. Merritt and
BY Burr W. Jones
Clinton S. Janes
ATTORNEY

Patented July 19, 1949

2,476,677

UNITED STATES PATENT OFFICE 2,476,677

CONTINUOUS STRIP CAMERA MAGAZINE

George E. Merritt and Burr W. Jones, Elmira, N. Y., assignors to Bendix Aviation Corporation, South Bend, Ind., a corporation of Delaware Application December 3, 1943, Serial No. 512,806

6 Claims. (Cl. 95—12.5)

The present invention relates to a continuous strip film camera for aerial reconnaissance and more particularly to a novel form of magazine therefor having reeling and exposing mechanism for the sensitized film.

The present application is a continuation in part of applicants' prior Patent 2,397,031, issued March 19, 1946, to which reference is made for a more complete description of the entire camera and its mode of operation.

As stated in said parent application, in strip cameras as used for aerial reconnaissance, it is customary to move a band of sensitized film across the focal plane of the camera in consonance with the movement of the image of the field of view caused by the transportation of the camera across the terrain to be reconnoitered. The exposure of the film is controlled by means of a diaphragm adjacent the focal plane of the camera having a slot normal to the movement of the film, which slot is adjustable in width to vary the time of exposure of the film for different lighting conditions and film speeds.

It is an object of the present invention to provide a novel film magazine and reeling mechanism for a continuous strip camera which is simple in construction, efficient and reliable in operation and convenient to load and operate.

It is another object to provide such a device in which the width of the exposure slot is automatically varied in direct proportion to the film speed, while maintaining the slot substantially symmetrical with respect to the optical axis of the camera.

It is another object to provide such a device in which the ratio of slot width to film speed may be varied in accordance with prevailing light conditions.

It is another object to provide such a device in which the running parts are so mounted on the base of the magazine that the light-tight cover can be removed without interfering with the operation of the mechanism.

It is a further object to provide such a device in which the film is accurately positioned and prevented from buckling by being held on a rotating drum during exposure thereof, the drum being of sufficient diameter so that the portion of the film opposite the slot does not curve away from the focal plane of the camera to any significant extent, and being positioned with its surface tangent to the focal plane of the camera at the optical axis thereof.

It is another object to provide such a device in which the film is supported at all points on rolling elements of comparatively large diameter so that its movement is at all times smooth and steady. Moreover, the film is not subjected to sliding friction which might cause scratching, and it is protected from sharp bends which might cause cracks at the low temperatures encountered in use at high altitudes.

It is another object to provide such a device incorporating novel means for reeling up the exposed film so as to maintain proper tension in the film.

It is another object to provide such a device in which the film is actuated by a motor driven drum on which it is carried during exposure.

It is another object to provide such a device in which the speed of the film-carrying drum can be varied continuously over a range sufficient to cover all conditions of use of the camera.

It is another object to provide such a device in which the rotating mechanism for the drum is arranged to provide a balanced drive which is contained within the confines of the drum itself.

It is a further object to provide such a device in which, when the drum is removed, the driving mechanism therefor may be operated for observation and adjustment.

It is a further object to provide such a device including novel guiding elements for holding the film in contact with the drum during the exposure of the film.

It is a further object to provide such a device including a novel meter for indicating the length of the film remaining on the supply spool.

It is a further object to provide such a device including provisions for impressing on the film, at regular intervals, a record of the times when the exposures thereof were made.

Further objects and advantages will be apparent from the following description taken in connection with the accompanying drawing, in which.

Figure 1:
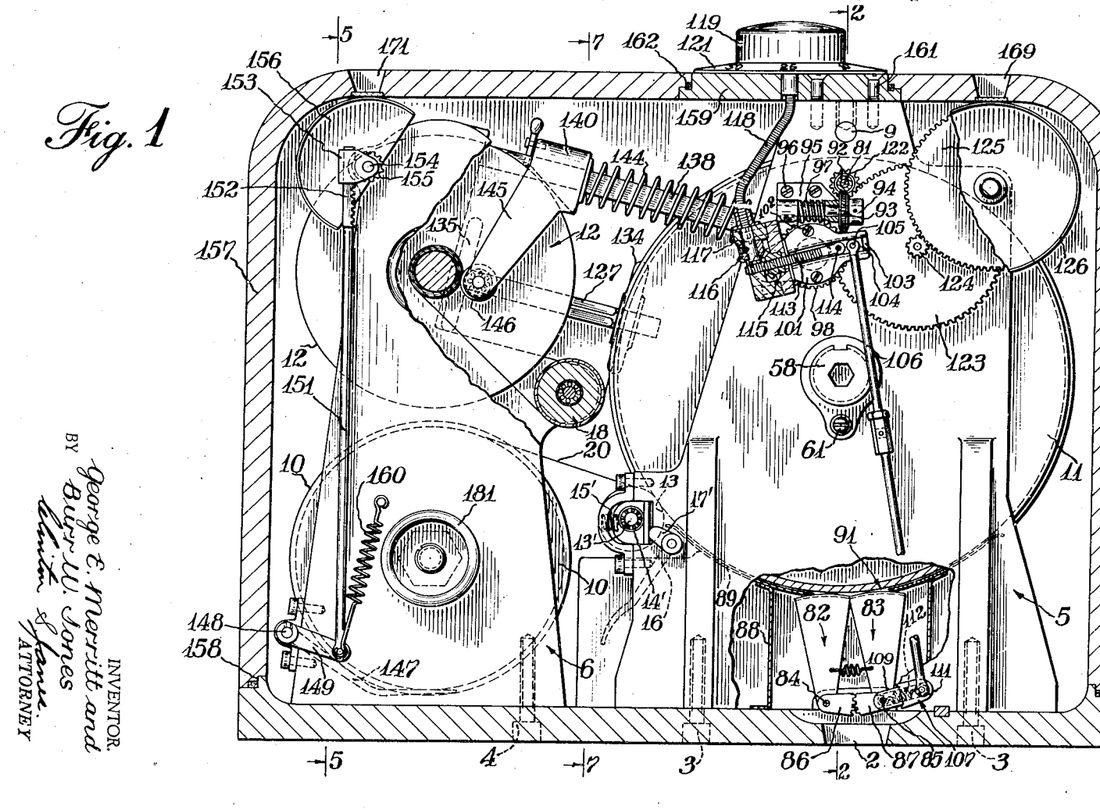
Fig. 1 is a side elevation of a preferred form of the invention partly in section and partly broken away for the sake of clarity, the section being substantially on the line 1—1 of Fig. 2.
Figure 2:
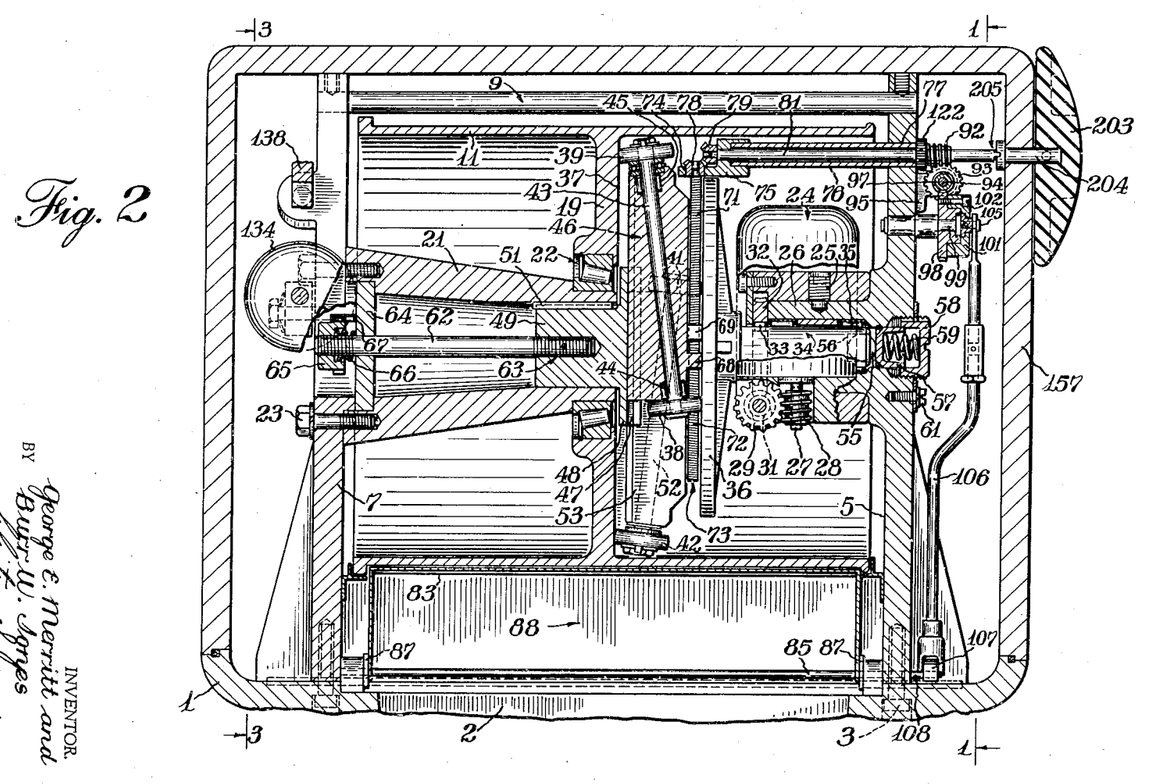
Fig. 2 is a vertical section taken substantially on the line 2—2 of Fig. 1.
Figure 10:
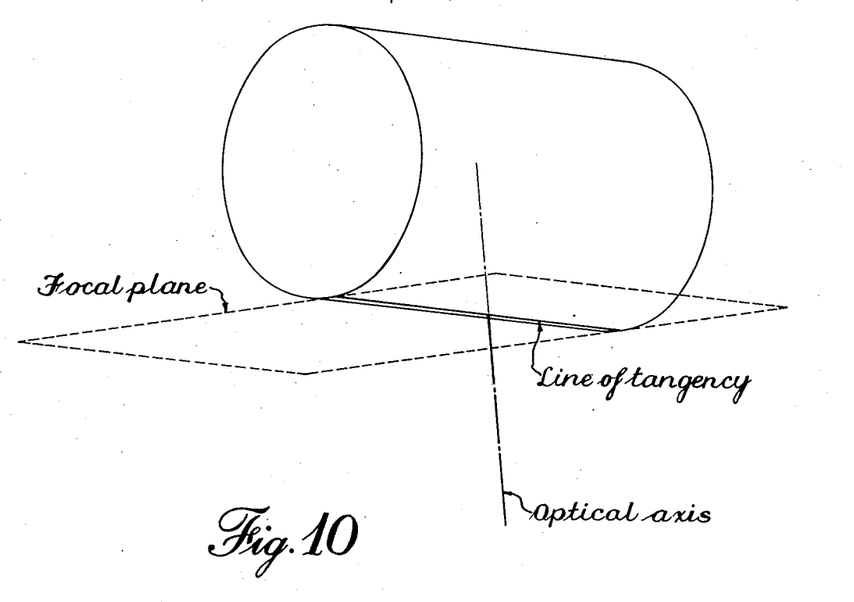
Fig. 10 is a diagram showing the relation of the exposure drum to the focal plane and optical axis of the camera.
Figure 11:
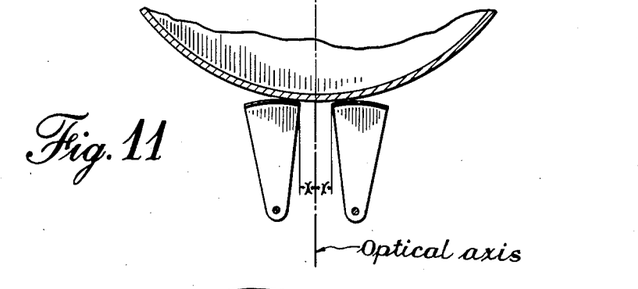
Fig. 11 is a sectional detail of a portion of the drum and shutter mechanism showing the relationship of the shutter mechanism to the optical axis of the camera.

In Fig. 1 there is illustrated a film magazine for a continuous strip camera comprising a base 1 having a rectangular opening 2 through which the image of the terrain to be photographed is projected by the optical system of the camera as illustrated and described in applicant's prior application referred to. Rigidly mounted on the base 1 as indicated at 3 and 4 are two pairs of mounting brackets or frame members 5, 6 (Fig. 1) and 7, 8 (Fig. 3), the brackets 5 and 6 being shown in detail in Fig. 4. Brackets 5 and 7 are preferably connected at their free ends by a tie-rod 9 as shown in Fig. 2. A film supply spool 10 and a take-up spool 12 are journalled on brackets 6 and 8 for rotation on horizontal axes, and an exposure drum 11 is journalled on brackets 5 and 7 for rotation on a parallel axis. As shown diagrammatically in Figs. 10 and 11, drum 11 is so mounted as to be tangent to the focal plane of the camera, with the optical axis substantially bisecting the line of tangency.

Means for guiding a photo-sensitive film 20 from the supply spool onto the exposure drum and for causing it to lie flat on the drum is provided comprising a guide roll 13 mounted on a shaft 13¹ journalled in bearings 14 and 14¹ slidably mounted in the brackets 5 and 7 and provided with springs 15 and 15¹ urging the bearings in a direction to press the guide roller against the surface of the drum 11. Means for retracting the guide roller 13 to facilitate threading the film on the drum is provided in the form of a crank 16 arranged to operate a pair of cams 17 and 17¹ which engage the bearings 14 and 14¹ to retract the guide roller when the crank is manually operated. A second guide roller 18 is journalled on the brackets 6 and 8 in position to engage the film after it leaves the drum 11 and guide it onto the take-up spool 12.

The drum 11 is hollow and is provided with a web 19 which is rotatably journalled on a tapered cylindrical bearing member 21 by means of a suitable anti-friction bearing 22. The bearing member 21 is rigidly fastened to the bracket 7 by suitable means such as indicated at 23.

According to the present invention means are provided for rotating the drum 11 which means is contained within the confines of the drum, and comprises continuously variable reduction gearing. For this purpose a motor 24 is rigidly mounted as indicated at 25 on a cylindrical extension 26 on the bracket 5, and is provided with an extended armature shaft 27 on which is suitably keyed a worm 28. The worm 28 is arranged to mesh with and drive a worm wheel 29 journalled on the extension 26 of bracket 5 and having fixed thereto a worm 31 which meshes in turn with a second worm wheel 32 splined as shown at 33 on a drive shaft 34 which is journalled as indicated at 35 in the interior of the cylindrical bracket extension 26. The drive shaft 34 has suitably fixed thereon a friction driving disc 36 having a plane surface spaced from and parallel with a similar plane surface 37 on the web 19 of drum 11.

Figure 6:
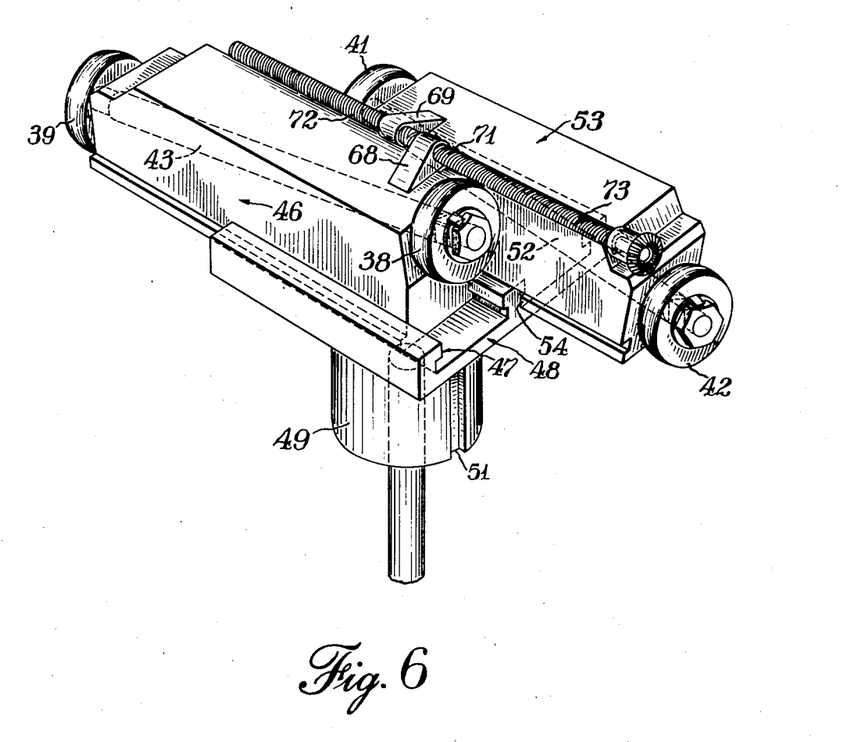
Fig. 6 is a perspective view of the adjustable drive gearing for the film carrying drum.

A variable speed transmission is provided between the driving disc 36 and the web 19 of the drum comprising two pairs of friction wheels 38, 39 and 41, 42. Friction wheel 38 is arranged to bear on the driving disc 36 and is fixed on a shaft 43 on the other end of which is fixed the friction wheel 39 in position to bear on the surface 37 of the web 19. Shaft 43 is journalled as indicated at 44 and 45 in a block 46 which block is mounted in a guide-way 47 (Fig. 6) in a frame 48 having a cylindrical extension 49 splined as indicated at 51 (Fig. 2) on the bearing member 21. Similarly, the friction wheels 41 and 42 are rigidly mounted on the opposite ends of a shaft 52 journalled in a block 53 in such manner as to frictionally engage the driving disc 36 and the web 19 respectively and movable radially by the sliding movement of block 53 in its guide 54 (Fig. 6).

Adjustable means for yieldably maintaining frictional engagement of the driving disc 36 with the frictional wheels 38 and 41 is provided in the form of a thrust ball bearing 55 mounted in a recess 56 in the end of the drive shaft 34 and arranged to bear against a thrust block 57 slidably mounted in a cup member 58 adjustably threaded in the bracket 5 and having a spring 59 urging the block 57 against the bearing member 55. The adjustment of the cup 58 is maintained by any suitable means such as indicated at 61.

Means for similarly maintaining frictional engagement between the friction wheels 39 and 42 and the web 19 of the drum is provided comprising a pull rod 62 fixed centrally as shown at 63 in the cylindrical extension 49 of frame 48 and extending through a thrust plate 64 clamped between the bearing member 21 and the bracket 7. A cup shaped nut 65 is threaded on the end of the pull rod 62 and a spring 66 is located between the nut 65 and the thrust plate 64 for yieldably maintaining tension on the pull rod 62. The adjustment of the spring 66 as determined by rotation of the nut 65 is maintained by any suitable lock means such as shown for instance at 67 in Fig. 3.

Means are provided for simultaneously sliding the blocks 46 and 53 in opposite directions in the frame 48 in order to vary the gear ratio between the driving disc 36 and the drum. As shown in Figs. 2 and 6, this is accomplished by providing lugs 68 and 69 on the blocks 46 and 53 respectively, said lugs having aligned openings therein which are oppositely threaded in order to cooperate with oppositely threaded parts 71 and 72 of a radially arranged shaft 73 which traverses said lugs and is journalled as shown at 74 in a bearing bracket 75 fixed on the end of a tube 76 rigidly mounted at 77 in the bracket 5. The oppositely threaded shaft 73 has a bevel gear 78 fixed thereon within the bracket 75 in position to mesh with a corresponding bevel gear 79 fixed on a shaft 81 journalled in the bracket 75 and tube 76 and arranged to be manually rotated in order to adjust the gearing.

As was explained in full in the parent application above referred to, the speed of the drum 11 is so adjusted by the operator as to cause the film mounted on the drum to move at such a speed as to maintain it substantially stationary with respect to the image of the terrain projected thereon by the camera. This is accomplished by the use of some form of sighting mechanism such as disclosed in the parent application which sighting mechanism forms no part of the present invention.

According to the present invention, means are provided for controlling the beam of light entering through the opening 2 in the base 1 so as to permit a band of light of greater or less width to strike the film on the drum and thereby secure properly timed exposure of the film to the light image. As shown more particularly in Figs. 1 and 2, this exposure controlling mechanism comprises a pair of arcuate shutter members 82, and 83 fixed on shafts 84 and 85, respectively, journalled at their ends on the base 1, and having intermeshing gear segments 86 and 87 fixed thereon which compel the shutter members to move equally in opposite directions. The outer surfaces of the shutter members are contiguous to the surface of the drum 11 and the mounting shafts 84 and 85 therefor are parallel to the axis of the drum whereby when the shutters are swung about the axes of said shafts the space between the shutters forms a slot of varying width which permits a band of light entering the opening 2 in the base to extend across the film on the drum normal to the motion of the film. The shutters are preferably so arranged that their adjacent edges are always equidistant from the optical axis of the camera, and so that the exposure slot defined thereby is maintained substantially symmetrical with respect to the line of tangency of the drum with the focal plane of the camera.

In order to prevent extraneous light from reaching the film, the opening 2 is surrounded by a light guard 88 fixed to the base 1 and to the brackets 5 and 7. The top of the shutter chamber is formed by a cylindrical diaphragm 89 conforming closely to the drum 11, and having an opening 91 aligned with the opening 2. The edges of opening 91 conform closely with the exterior surfaces of shutter members 82 and 83 so that when the shutters are in engagement with each other as shown in Fig. 1, the opening 91 is effectively closed to the passage of light.

Means are provided for moving the shutter members 82, 83 to automatically adjust the width of the opening or slot therebetween in accordance with variations in rotary speed of the drum 11. As shown in Figs. 1 and 2, this means comprises a worm 92 fixed on the manually operable shaft 81 and meshing with a worm wheel 93 fixed on a shaft 94 journalled in a bearing member 95 which is fixed as indicated at 96 to the bracket member 5. Shaft 94 has fixed thereon a worm 97 which meshes with a worm wheel 98 which is rotatably mounted on the bracket member 5 as by means of a stud 99. A crank member 101 is fixed to the worm wheel 98 as shown at 102 and has formed therein a guide-way 103 in which is slidably mounted a block 104 carrying a crank pin 105. A link 106 connects the crank pin 105 with a crank 107 fixed on an extension 108 of the shutter shaft 85 whereby rotation of the worm wheel 98 is caused to rotate shutters 82, 83. Preferably, crank 107 is made in two parts 109 and 111 connected by a spring 112 permitting the crank to yield in case the gearing should be operated beyond the closed position of the shutter members. It will be understood that the dimensions and ratios of the parts are so calculated that adjustment of the friction gearing by the shaft 81 will effect adjustment of the shutter members in the same ratio. That is, if the speed of the drum is increased by ten percent, the width of the slot between the shutter members is increased by the same percentage.

Means are also provided for varying the ratio between the width of the slot between the shutter members 82, 83 and the speed of the drum. Thus, in one light condition a slot width of 0.05 of an inch might provide a correctly timed exposure when the drum is rotating at a surface speed of 2.5 inches per second. If the light reflected from the terrain to be photographed should increase, either by a change in the character of the terrain or by an increase in illumination thereof, it is necessary to correspondingly reduce the width of the slot in order to provide correct exposure of the film. This is accomplished as here illustrated by an adjustment of the crank pin block 104 in its guide 103 to decrease the throw of the crank. For this purpose, a shaft 113 is pivoted to the block 104 as shown at 114 and is threaded within a bevel gear 115 journalled on the crank member 101. A cooperating bevel gear 116 is fixed on a stub shaft 117 also journalled on the crank member 101 and connected by a flexible shaft 118 to a knob 119 rotatably mounted on the top of the bracket 5 and provided with a dial 121 having suitable graduations for indicating the adjustment of the crank block 104.

Means for indicating the linear speed of the film on the drum 11 is provided comprising a pinion 122 mounted on the gear adjusting shaft 81 which pinion meshes with a gear 123 journalled on the bracket 5 and having a pinion 124 meshing with a gear 125 also journalled on the bracket 5 and connected to rotate a dial wheel 126.

Figure 3:
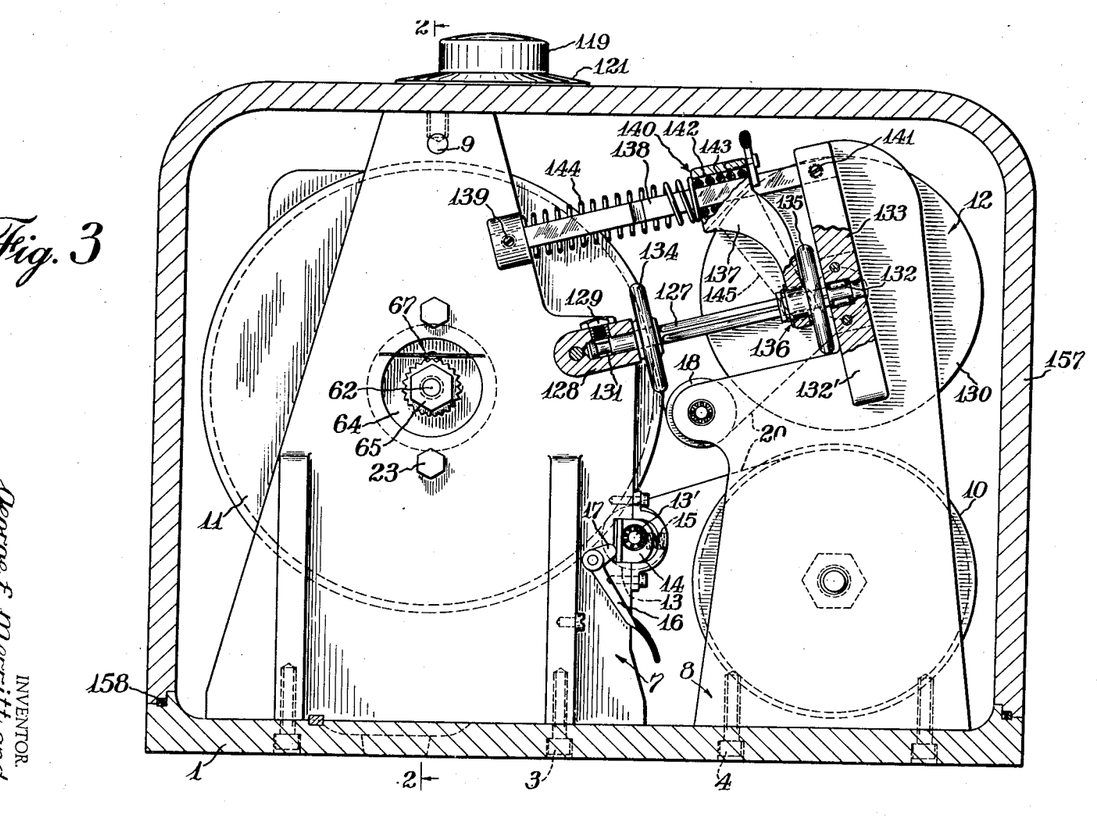
Fig. 3 is a vertical section taken substantially on the line 3—3 of Fig. 2.
Figure 4:
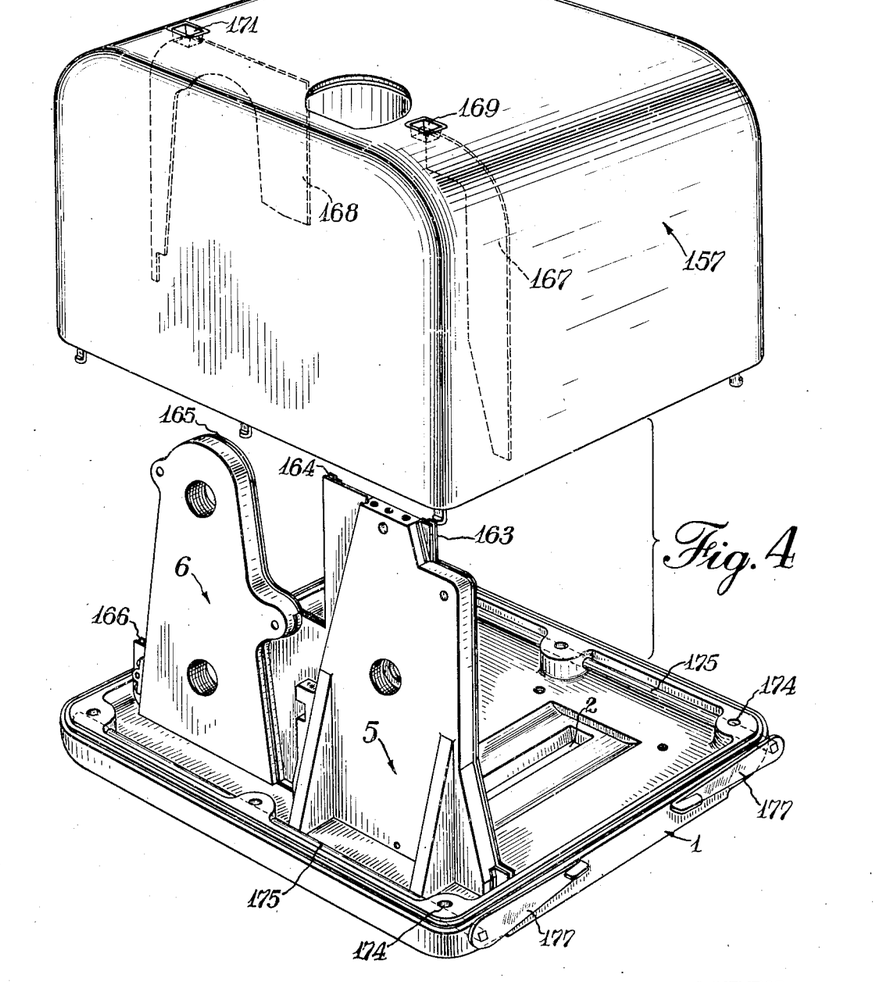
Fig. 4 is a perspective view of the base plate for the magazine, two of the supporting brackets for the reeling mechanism, and the light-tight cover therefor shown in disassembled relation.

Means are provided for rotating the take-up spool 12 at such a speed as to maintain the linear speed of the film being wound thereon equal to the linear speed of the film on the drum 11, so as to prevent the formation of slack on the film as it leaves the drum, as shown in Figs. 1 and 3. For this purpose, a splined shaft 127 is journalled at one end in a socket member 128 fixed to the bearing bracket 7 and retained in said socket member as by means of a stud 129 seated in a groove 131 of said shaft. The other end of the shaft 127 is journalled by means of a bearing 132 in a lateral projection 132¹ on the bearing bracket 8. A friction wheel 134 is fixed on the splined shaft 127 in position to bear on the end of the drum 11 at the same radius as the cylindrical surface which carries the film. The peripheral speed of the wheel 134 as it is rotated by the drum is thus equal to the linear speed of the film on the drum.

A second friction wheel 135 is slidably but non-rotatably mounted on the splined shaft 127 in position to engage a disc 130 (Fig. 5) formed on or connected to the end of the take-up spool 12 in any suitable manner. Preferably the disc is separate from the spool and is fixed as by welding on a bearing pin or gudgeon 150 which serves as a bearing for one end of the spool. This gudgeon is rotatably mounted in the bracket 8, an adjustable yielding thrust bearing being provided as shown at 150¹ to maintain proper engagement between the disc and friction wheel 135. In order to transmit rotation from the disc 130 to the take-up spool, a pair of key members 130¹ are welded to said disc and to the gudgeon 150, and extend into suitable openings in the hub of the spool.

The disc 130 and spool 12 are rotated by the engagement of the friction wheel 135 at varying speeds depending upon the radius of the point of engagement of said wheel with the disc.

In order to make this point of engagement coincide with the surface of the film wound on the take-off spool, the wheel 135 is swiveled as indicated at 136 to one arm 137 of a bifurcated member 140 which is slidably mounted on a guide rail 138 anchored at 139 to the bracket 7 and at 141 to the bracket 8. The rail 138 is parallel to the splined shaft 127 and acts as a tie-rod to assist in keeping the brackets 7 and 8 rigidly spaced. The bifurcated member 140 is provided with a non-circular opening 142 in which are mounted rollers 143 which bear on the flat surfaces of the rail 138 thus facilitating the sliding movement of the member 140 on the rail, while preventing rotation of the member with respect to the rail. A spring 144 is mounted on the rail 138 between the bracket 7 and the member 140 urging the member in a direction to move the wheel 135 toward the axis of the take-up spool 12.

The bifurcated member 140 is arranged to straddle the end flange of the take-up spool 12, the inner arm 145 of said member having a roller 146 rotatably mounted in the end thereof in position to bear on the surface of the film wound on the take-up spool. As shown best in Fig. 1, the point of engagement of the roller 146 with the surface of the film is arranged to be at the same radius from the axis of the spool 12 as the point of engagement of friction wheel 135 with the end of said spool. As the film builds up on the spool 12, it will cause the bifurcated member 140 to move back against the action of spring 138 thereby maintaining the engagement of the friction wheel 135 with the end of the spool at the same radius as the surface of the film on said spool. Friction wheels 134 and 135 are of the same diameter, so that the above arrangement secures the stated object of maintaining the linear speed of the film wound on the take-up spool equal to the linear speed of the film on the drum 11.

Means are preferably provided for showing the amount of film remaining on the supply spool 10. For this purpose, an arm 147 is fixed on a shaft 148 journalled on the bracket 6 in position to cause said arm to bear on the surface of the film on the supply spool. A crank 149 is fixed on the outer end of shaft 148 and means are provided in the form of a spring 160 anchored at one end on the bracket 6 and acting on the free end of the crank to hold the arm 147 in engagement with the surface of the film on the spool 10. A link 151 is pivoted at one end to crank 149 and at its other end is formed as a rack 152 slidably mounted in a guiding and supporting member 153. Guide 153 is journalled on a shaft 154 which is rotatably mounted in the upper end of the bracket 6 and carries a pinion 155 arranged to mesh with the rack 152. Pinion 155 is arranged to rotate a dial wheel 156 which is calibrated to indicate film footage remaining on the supply spool.

The film magazine is provided with a light-tight enclosure in the form of a cover 157 having a light and dust tight joint 158 with the base 1. A circular section 159 of the casing having a slightly larger diameter than the dial 121 of knob 119 is cut out and attached to the top of the bearing bracket 5 by suitable means such as indicated at 161, a light and dust tight joint 162 being provided between this section 159 and the body of the cover 157. This arrangement permits removal and replacement of the cover without disturbing the knob 119.

The bearing brackets 5, 6 are provided on their edges with flanges 163, 164, 165 and 166 (Fig. 4) arranged to cooperate with baffle members 167, 168 mounted in the interior of the cover 157 to form a light-tight partition when the cover is seated on the base 1 of the magazine. The top of the cover 157 has a pair of peep holes 169, 171 located above the film speed indicating dial wheel 126 and the footage meter dial wheel 156, respectively, and preferably provided with hairlines for use in conjunction with such dials. It will be understood that the light-tight partition formed by brackets 5, 6 and baffles 167, 168 prevents any light which enters the peep holes from leaking into the film storage compartment of the magazine.

Figure 5:
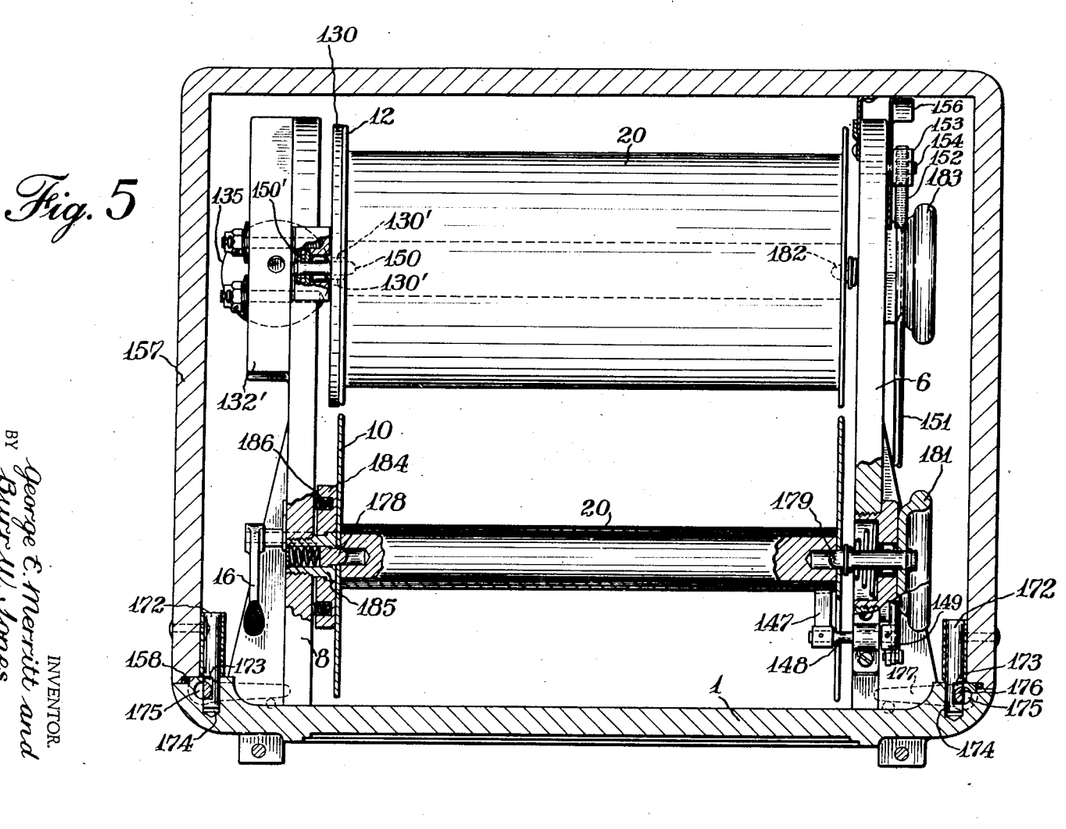
Fig. 5 is a vertical section taken substantially on the line 5—5 of Fig. 1, some of the parts being broken away to show interior structure.

The cover 157 is preferably clamped down onto the base 1 by means which are capable of exerting considerable pressure in order to insure a light-tight joint, while being readily released. As shown in Fig. 5 this may be accomplished by mounting in the cover a series of studs 172 having outwardly facing square notches 173 which studs are arranged to enter registering holes 174 drilled in the base 1. Lock shafts 175 are journalled in the base 1 and are provided with slabbed-off sections 176 adapted to be moved into and out of the notches 173 by rotation of said shafts. Arms 177 are fixed on the ends of shafts 175 for manual rotation thereof into and out of locking position.

The film supply spool 10 is journalled on spring pressed gudgeons 178 and 179, the latter being provided with a hand wheel 181 by which it may be withdrawn in order to release the spool. Similarly, the take-up spool 12 is provided with a spring pressed gudgeon 182 aligned with the gudgeon 150 which may be withdrawn by a hand wheel 183 to release the spool.

A friction brake for preventing overrunning of the supply spool 10 is preferably provided being here shown in the form of a disc 184 non-rotatably mounted on a tubular stud 185 threaded in the bracket 8 and acting as a holder for the spring pressed gudgeon 178. The brake 184 is urged into frictional engagement with the end of the supply spool by suitable means such as springs 186.

Figure 7:
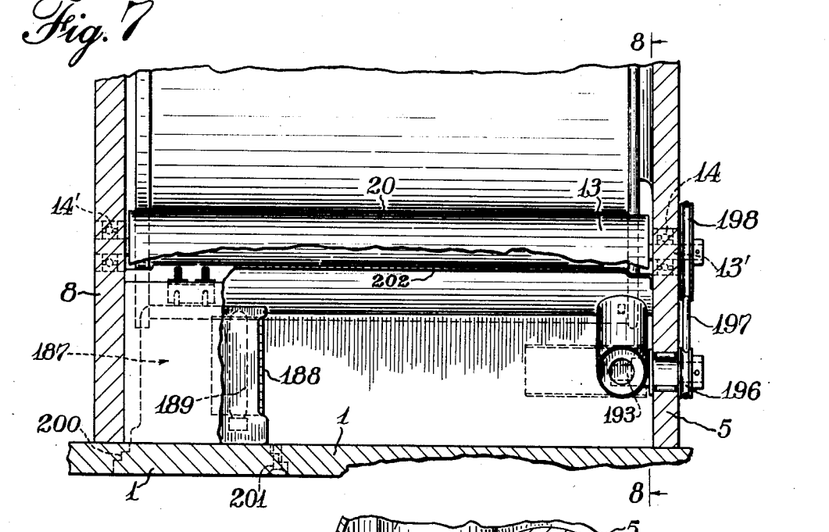
Fig. 7 is a detail of the time recording mechanism, partly in section substantially along the line 7—7 of Fig. 1.
Figures 8, 9:
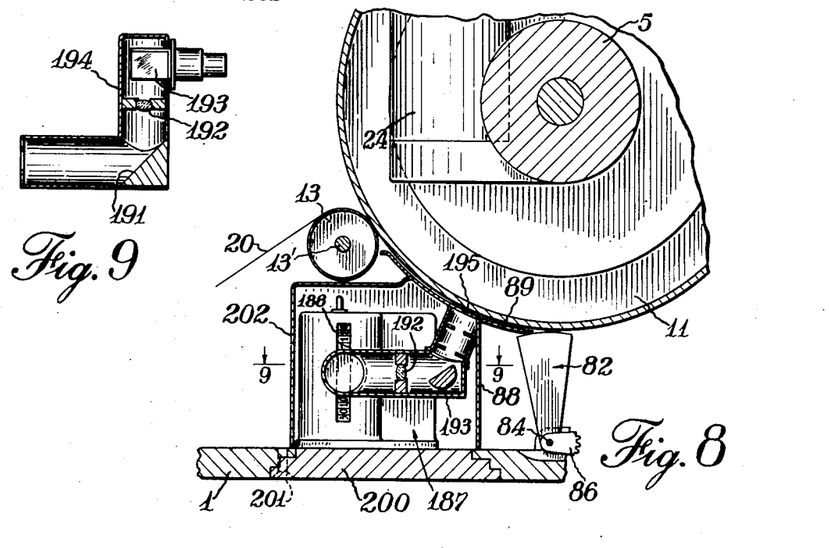
Fig. 8 is a sectional detail taken substantially on the line 8—8 of Fig. 7.
Fig. 9 is a sectional detail taken substantially on the line 9—9 of Fig. 8.

When photographic reconnaissance is carried on for military purposes, it is frequently important to know the precise time when the film is exposed. For this purpose, applicants have provided a means for photographically impressing a time record on the margin of the film at suitable intervals. In Fig. 7, there is shown a clock 187 of any suitable type having a dial 188 illuminated by a light source 189. An optical system for projecting an image of the dial on the margin of the film is provided comprising a mirror 191, a lens 192 and a rotatable mirror 193, said optical system being enclosed in a suitable light-tight tubular conduit 194 attached to the shutter chamber 88 and diaphragm 89. Said diaphragm has an opening 195 permitting the image of the clock to be projected on to the surface of the drum 11.

The mirror member 193 is journalled in the bearing bracket 5 and is provided with a pulley 196 which is connected by a belt 197 to a pulley 198 mounted on the projecting end of the shaft 13¹ which carries the tension roller 13. The ratio between the pulleys 196 and 198 is so arranged that the mirror 193 rotates at a speed which causes the image of the clock dial as it is thrown on the drum to move at substantially the same speed as the surface of the drum. The reading of the clock dial is thereby impressed photographically on the margin of the film in substantial synchronism with the exposure of the film.

The clock unit 187 is preferably mounted on a cut-out portion of the base 1 with a light-tight joint 200, suitable detachable fastening means 201 being provided so that the unit may be conveniently removed for inspection, winding or setting. The timing system is preferably enclosed in a light-tight casing 202, one of the walls of which is preferably constituted by the wall 88 and diaphragm 89 of the shutter chamber.

A hand wheel 203 for operating the film speed adjusting shaft 81 is journalled in the cover 157 on a stub shaft 204 which has a tongue and groove connection 205 with said shaft. It will be understood that if deemed desirable the stub shaft 204 may be mounted on a cut-out section of the cover attached to the bracket 5 so as to permit removal of the cover without disconnecting the hand wheel 203.

When it is desired to load the camera, the hand wheel 203 is rotated until the groove in the stub shaft 204 is vertical, which may be indicated by a suitable mark on the hand wheel. The cranks 177 of the fastening devices are then rotated to remove the slabbed-off sections of the locking bolts 175 from the notches 173 in studs 172. The cover is then removed, the crank 16 is actuated to retract the tension roller 13 from the drum 11, and the hand wheel 183 retracted so as to release the take-up spool carrying the exposed film. The empty supply spool is then released by retraction of hand wheel 181, a new supply spool with fresh film is mounted in its place and the empty spool is reinstalled as the take-up spool. It will be understood that when the new supply spool is inserted, the surface of the film thereon engages the arm 147 which rotates the footage meter 156 into full position.

The end of the film is then passed over the tension roller 13 and between the diaphragm 89 and drum 11, around the drum, under the guide roller 18 and attached in any suitable manner to the hub of the take-up spool 12. The cover 157 is then replaced and locked down by the holding clamps 177, etc.

In operation, the knob 119 is set to a position corresponding to the prevailing light conditions as indicated by a light meter, the motor 24 is started and the hand wheel 203 is rotated to synchronize the film speed with the speed of the image of the terrain to be photographed. This may be done by a sighting device or may be accomplished by setting the hand wheel at a predetermined position in accordance with a table which shows film speeds corresponding to various ground speeds and altitudes as disclosed in detail in the parent application.

Although but one form of invention has been shown and described in detail, it will be understood that variations in the specific embodiments of the various features may be substituted, and that the arrangement of the elements may be changed, and certain of the elements may be omitted where their functions are deemed unnecessary without departing from the spirit of the invention as defined in the claims appended hereto.

What is claimed is:

1. In a continuous strip camera for aerial reconnaissance, a film holder including a rotatable exposure drum arranged substantially tangent to the focal plane of the camera, light obstructing means providing a slot of adjustable width arranged in front of the drum adjacent its line of tangency with the focal plane, a motor, variable speed gearing for rotating the drum from said motor, manually operable means for varying the ratio of said gearing, mechanical means for so connecting said gear ratio varying means to the slot varying means that adjustment of the gear ratio varying means actuates the slot varying means to maintain a predetermined direct ratio between the width of the slot and the peripheral speed of the drum, and manually operable means for changing said ratio without interrupting the rotation of the drum.

2. In a continuous strip film camera for aerial reconnaissance, a light-tight magazine having a film-carrying rotatable drum with its periphery tangent to the focal plane of the camera, movable masking means providing a light-admitting slot parallel to the axis of the drum adjacent to its line of tangency with the focal plane, means including variable speed gearing for rotating the drum to move the film thereon in consonance with the movement of the image of the field of view caused by the transportation of the camera, manually operable means for adjusting the variable speed gearing including a rotatable member, means including a crank member actuated by said rotatable means to move said masking means to vary the width of the light-admitting slot, and manually operable means to vary the throw of said crank.

3. In a strip camera for aerial reconnaissance, a film holder including a rotatable exposure drum arranged substantially tangent to the focal plane of the camera, light-obstructing means providing a slot of adjustable width arranged in front of the drum adjacent the line of tangency with the focal plane, said light-obstructing means comprising a pair of pivotal masking members having adjacent straight edges forming the edges of the slot, means for varying the speed of rotation of the drum, means for swinging said masking members in opposite directions, a mechanical connection between the drum speed varying means and the means for swinging the masking members so arranged that a change in drum speed causes a directly proportional change in the width of the slot between the masking members; said swinging means including a crank member, and manually operable means for varying the throw of said crank member to thereby vary the ratio between drum speed and slot width.

4. In a continuous strip camera for aerial reconnaissance, a light-tight magazine including a base, a removable cover mounted thereon, a film supply spool, an exposure drum, and a spool for receiving the film after exposure, said spools and drum being rotatably mounted on parallel axes on the base of the magazine independent of said cover; means independent of said cover for guiding the film from the supply spool around the drum to the receiving spool, means for rotating the drum including variable speed gearing housed within the drum, variable speed gearing for rotating the film-receiving spool from the drum, means for continually changing the ratio of the latter gearing to maintain the linear speed of the film on the receiving spool equal to the linear speed of the film on the drum, and means for mounting the drum on the base of the magazine independent of the cover and of said gearing whereby the cover may be taken off and the spools and drum removed without dismantling the gearing.

5. In a strip film camera, a light-tight magazine including a base having an adjustable light-admitting slot and a cover detachably fixed to the base, a film-carrying drum journalled on the base of the magazine on an axis parallel to the slot, a motor, and variable speed gearing housed within the drum for rotating the drum, and means including a manually operable member projecting through said cover with a detachable light-tight bearing, for simultaneously and proportionately adjusting the ratio of the gearing and the width of the slot.

6. In a continuous strip film camera, a film magazine including a base member, a detachable cover in the form of a box with one side open for attachment to the base, a film supply spool, a take-up spool, an exposure drum, and brackets for mounting the spools, drum and rotating means rigidly on said base within the cover but independently of the cover, a variable speed drive for the exposure drum, adjustable masking mechanism for controlling the exposure of the film on the drum, unitary means including a manually operable element extending outside the magazine for effecting simultaneous and proportionate adjustment of the drive and masking mechanism, and means within the cover, visible from the exterior thereof, for indicating the adjustment of the drive and of the masking mechanism, said cover and brackets having cooperating baffles forming a light-tight film chamber within the cover partitioned off from said indicating means.

GEORGE E. MERRITT.
BURR W. JONES.

REFERENCES CITED

The following references are of record in the file of this patent:

UNITED STATES PATENTS

| Number | Name | Date |
|---|---|---|
| 621,545 | Stark | Mar. 21, 1899 |
| 706,664 | Jackson | Aug. 12, 1902 |
| 780,382 | Reavill | Jan. 17, 1905 |
| 812,163 | Bried | Feb. 6, 1906 |
| 867,396 | Muller et al. | Oct. 1, 1907 |
| 893,819 | Stewart | July 21, 1908 |
| 1,071,346 | Reeves | Aug. 26, 1913 |
| 1,408,249 | Beiswenger | Feb. 28, 1922 |
| 1,414,941 | Gill | May 2, 1922 |
| 1,428,352 | Altschuler | Sept. 5, 1922 |
| 1,448,906 | Altschuler et al. | Mar. 20, 1923 |
| 1,559,400 | Bagley et al. | Oct. 27, 1925 |
| 1,723,926 | Fairchild | Aug. 6, 1929 |
| 2,077,486 | Lootens | Apr. 20, 1937 |
| 2,210,090 | Lutz et al. | Aug. 6, 1940 |
| 2,292,825 | Dilks, Jr. | Aug. 11, 1942 |
| 2,307,646 | Sonne | Jan. 5, 1943 |
| 2,349,931 | Back | May 30, 1944 |
| 2,397,031 | Merritt et al. | Mar. 19, 1946 |
| 2,401,530 | Vought | June 4, 1946 |